United States Patent [19]
Landers et al.

[11] Patent Number: 5,153,032
[45] Date of Patent: Oct. 6, 1992

[54] COATING COMPOSITIONS AND METHOD FOR FORMING A SELF-HEALING CORROSION PREVENTATIVE FILM

[75] Inventors: Perry E. Landers, Bedford, Ind.; George F. Felton, Bel Air, Md.; Richard L. Williams, Lexington, Ky.

[73] Assignee: Ashland Oil, Inc., Ashland, Ky.

[21] Appl. No.: 199,975

[22] Filed: May 27, 1988

Related U.S. Application Data

[60] Division of Ser. No. 818,437, Jan. 13, 1986, abandoned, which is a continuation-in-part of Ser. No. 921,998, Oct. 22, 1986, Pat. No. 4,748,055.

[51] Int. Cl.$^5$ .............................................. B05D 3/02
[52] U.S. Cl. .................................. 427/327; 427/387; 427/388.4
[58] Field of Search ............... 106/14.11, 14.12; 427/240, 292, 409, 421, 428, 429, 435, 327, 387, 388.4

[56] References Cited

U.S. PATENT DOCUMENTS

| | | | |
|---|---|---|---|
| 2,394,596 | 2/1946 | Davis et al. | 252/33.4 |
| 2,465,247 | 3/1949 | McBride | 148/6.16 |
| 2,528,535 | 11/1950 | Merker | 252/49.6 |
| 2,972,580 | 2/1961 | Mullen | 252/33.4 |
| 3,457,173 | 7/1969 | Pater | 252/46.3 |
| 3,508,933 | 4/1970 | Yates | 106/10 |
| 3,660,303 | 5/1972 | Hiestand | 252/311.5 |
| 3,686,031 | 8/1972 | Balthis | 117/234 |
| 3,813,337 | 5/1974 | Sheldahl | 252/33.4 |
| 3,836,371 | 9/1974 | Kokeska | 106/10 |
| 3,890,271 | 6/1975 | Kokeszka | 260/46.5 |
| 3,960,575 | 6/1976 | Martin | 106/10 |
| 3,967,948 | 7/1976 | McCullough | 71/29 |
| 4,338,141 | 7/1982 | Senzaki et al. | 427/327 X |
| 4,419,199 | 12/1983 | Hauffe | 204/181 |
| 4,440,582 | 4/1984 | Smith | 148/6.15 |
| 4,444,803 | 4/1984 | Winters | 427/27 |
| 4,461,656 | 7/1984 | Ross | 148/16.6 |
| 4,479,981 | 10/1984 | Winters | 427/27 |
| 4,539,051 | 9/1985 | Hacias | 148/6.15 |
| 4,540,637 | 9/1985 | Geary et al. | 428/626 |
| 4,589,991 | 5/1986 | Ryer | 252/47 |
| 4,737,385 | 4/1988 | Pekar et al. | 427/385.5 |
| 4,748,055 | 5/1988 | Landers et al. | 427/292 |

FOREIGN PATENT DOCUMENTS

| | | |
|---|---|---|
| 0001318 | 4/1979 | European Pat. Off. |
| 0093388 | 11/1983 | European Pat. Off. |
| 0200916 | 11/1986 | European Pat. Off. |
| 0810782 | 3/1981 | U.S.S.R. |

OTHER PUBLICATIONS

"Painting Forum", Dr. Norman Roobol, Industrial Fish Oct. 1985, p. 22.
Nitrowear "Ferritic Nitrocarburizing in Fluid Bed Furnaces", Nitro-Wear Technology Inc., 1984.
"The QPQ Process", Kolene Corporation, Bulletin Q-83.
Kirk & Otmer "Encyclopedia of Chemical Technology", 2nd ed. vol. 18 (1969), pp. 282-303.
"Fluidized Bed Furnace Heat Treating Applications for the DYE Coating Industry", Japka, May-Jun. '83, Dye Co.
"Using the Fluidized Bed for Nitriding-Type Processes" by Joseph E. Japka, Metal Progress-Feb. '83, pp. 27-33.
"Nitrotec Surface Treatment", Heat Treatment of Metals, 1982, pp. 85-90.
"Oil Additives Rust Preventives Fuel Additives", Alox Corp., Product Bulletin, Technical Data Sheet.

Primary Examiner—Michael Lusignan
Attorney, Agent, or Firm—Richard C. Willson, Jr.; Stanley M. Welsh

[57] ABSTRACT

Self-healing coatings are formed by first phosphating or nitriding ferrous parts, then coating with an emulsion of e.g. polysiloxane, oil, sorbitan derivative and sodium sulfonate, butyl cellosolve, oleic acid. Preferred phosphating is to a thickness of 2,000–3,000 mg Zn phosphate/square foot. This coating passes 240-plus hours in 5% salt spray (ASTM B-117) and resists wash off with car wash soap.

10 Claims, 2 Drawing Sheets

COATING COMPOSITIONS AND METHOD FOR FORMING A SELF-HEALING CORROSION PREVENTATIVE FILM

This application is a division of Ser. No. 06/818,437, filed Jan. 13, 1986, now abandoned, which is a continuation-in-part of Ser. No. 06/921,998, filed Oct. 22, 1986, now U.S. Pat. No. 4,748,055.

BACKGROUND OF THE INVENTION

1. Field of the Invention

The present invention pertains to coatings and metal surface treatments preparatory to applying such coatings.

2. Description of the Prior Art

Many attempts have been made to improve the salt spray protection provided by protective coatings including among others, improvements in compositions of coating materials and also pretreatments prior to coatings to modify the chemical surface for better bond with the protective coating.

U.S. Pat. No. 2,528,535 to Merker teaches phosphating oil-in-water systems for lubricating compositions, preferably with oxidation inhibitors and mentions the possibility of adding and rust corrosion inhibitors, preferably less than 3% by weight.

U.S. Pat. No. 3,457,173 to Pater lubricates metal surfaces by applying siloxane-polyoxyalkylene block copolymers.

Soviet Union Patent 0810782 teaches polymerized cotton seed oil apparently used as a lubricant.

U.S. Pat. No. 4,440,582 to Smith, et al. claims coating compositions consisting essentially of phosphating oil, polysiloxane or alkylpolysiloxane and water and expresses a preference for applying such coating compositions to metal parts which have been phosphated.

None of the above references teach the surprising improvement obtained by the present invention's use of sorbitan and preferably also alkaline earth, e.g. barium, sulfonates.

It is particularly surprising that, in spite of the teaching of U.S. Pat. No. 4,440,582 that the compositions should consist essentially of (be restricted to) phosphating oils, siloxanes and water, the present invention involves the discovery that very substantial increases in performance can be obtained by adding one or more of the additional ingredients disclosed herein.

SUMMARY

(1) General Statement of the Invention

The present invention, by using emulsions produced from oil-based concentrates comprising petroleum oils, siloxanes, and organic salts produced by reacting polyfunctional long chain organic compounds, e.g. polyamines or polyhydroxides or mixed polyamine/polyhydroxides with an organic acid provides when measured dramatically improved salt spray performance, particularly after car wash or contact with other detergent solutions. When applied over prepared ferrous metal surfaces, e.g. nitrided, chromated or phosphated ferrous metal work pieces, the compositions of the invention provide essentially self-healing polymer coatings, particularly suited for use in motor vehicles, military equipment, and all sorts of machinery. The invention is applicable to virtually any phosphated or nitrided work piece requiring substantial corrosion protection and can provide some protection for even nonferrous workpieces.

(2) Utility of the Invention

The invention is useful for protecting metals, copper, iron, tin, cadmium, chromium, and zinc particularly ferrous work pieces and especially those which have been previously phosphated or nitrided. While not wishing to be held to any theory of the invention, it appears that the nitriding or phosphating increase the roughness of the metal surface, providing irregularities which more firmly grip and bond the coating layer to the metal work piece.

Sand blasting, galvanizing and other method of surface roughening can be used in place of or in conjunction with, nitriding or phosphiding. Of particular importance with such treatments is the nature of the metal surface. Copper plate, cadmium plate, chrome plate, and tin plate have been found particularly suited for coating in accordance with this invention. In fact, the coatings of this invention, when applied to tin, copper, zinc, chrome, or cadmium plate surfaces, performed dramatically and surprisingly better in salt spray testing than that found when such coatings were applied to iron or steel surfaces. Sand blasted and/or galvanized chrome plate usually exhibit significant benefits from using this invention.

BRIEF DESCRIPTION OF THE DRAWING(S)

DESCRIPTION OF THE PREFERRED EMBODIMENT(S)

(1) Starting Materials

Figure 1:
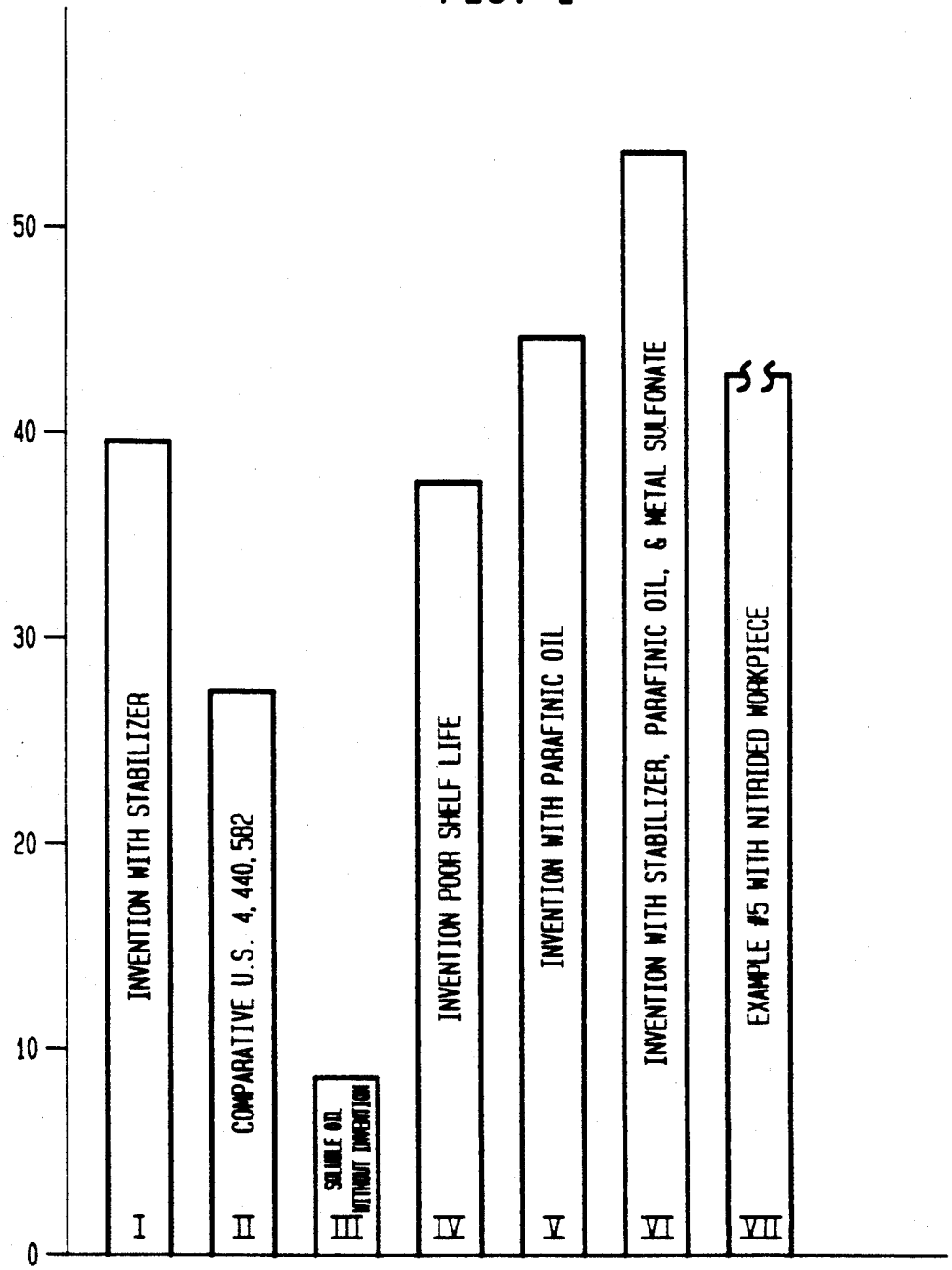
FIG. 1 is a graph of salt-spray resistance (hours) for several inventive and conventional formulations.
Figure 2:
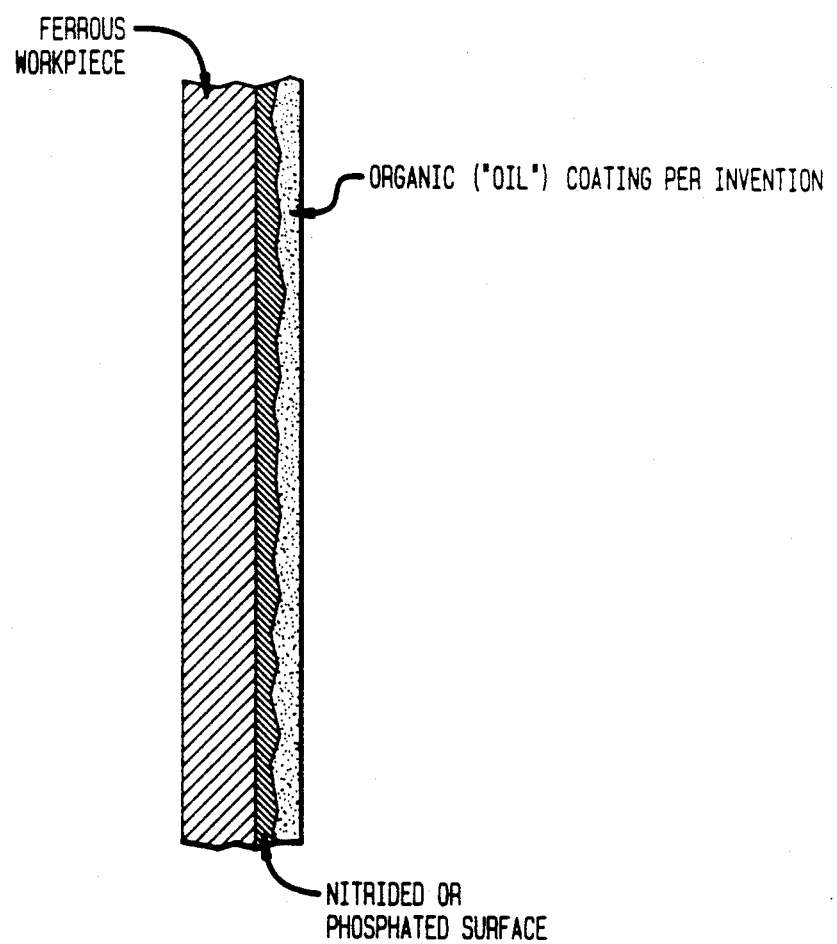
FIG. 2 is a schematic diagram of a manufacture according to the invention.
Figure 3:
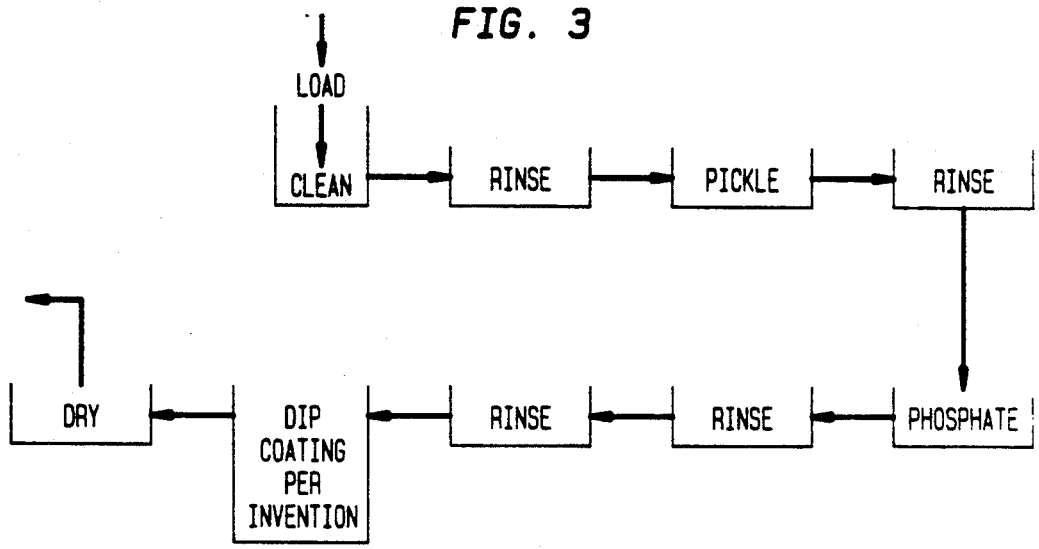
FIG. 3 is a schematic diagram of a process of the present invention showing the phosphatizing followed by the dip coating into the emulsion compositions of the invention.

A. Oil:

The oils useful in the present invention are petroleum-derived, with naphthenic oils being less preferred and paraffinic being more preferred. More preferable paraffinic oils include those having an SSU viscosity in the range of about 50 SSU to about 700, more preferably 100 to 400 and most preferably 250 to 370 seconds at 38° C. (100° F.). Particularly preferred are oils having a viscosity index of above 90, more preferably above 95.

The oil will preferably comprise from about 20 to 95, more preferably 30 to 80 and most preferably 45 to 85 wt % of the total formulation of the invention concentrate.

The oil functions mainly as a carrier plus a medium for orientating sulfonate containing molecules. Mineral spirits apparently does not orientate these molecules approximately, and consequently do not work even though they make what appears to be a nice dry film, since the corrosion protection they provide is poor.

We have found that using a solvent-wax system provides a more water resistant film, plus orienting the sulfonate molecules. Examples of materials suitable for a solvent wax system include oxidized petrolatums having a sufficient number of reactive carboxylic acid groups to react with a glycol emulsifier such as ALOX575. Suitable acid numbers for such oxidized petrolatums are in the range of about 20 to 70, and preferably about 30 to 55.

B. Glycol Ester:

The invention comprises glycols, glycol ether and derivatives thereof. Preferred are alkyl carbitols especially Butyl carbitol or most preferably, ethylene glycol monobutyl ether e.g. butyl cellosolve or Extasolve manufactured by Eastman Kodak, Rochester.

The glycols, etc. will preferably comprise from about 0.1 to 15, more preferably 1 to 10 wt. % of the total formulation.

C. Emulsifying Agent:

The invention comprises emulsifying agents such as oxygenated hydrocarbons partially neutralized with alkaline earth metal (e.g. barium) then blended with alkali metal (e.g. sodium) sulfonate compositions such as ALOX575 available from ALOX Corp. of Niagara Falls or IDASOL D274 from Ideas, Inc. Woodale, Ill., or similar products from N. L. Kimes, Inc., Allison Park, Pa.

The emulsifying agent will preferably comprise about 5 to 50, more preferably 8 to 35, and most preferably 20 to 30 wt. % of the total formulation.

Optionally but preferably, a fugitive emulsifier can be used to improve film forming integrity and performance. A combination of sodium sulfonate, and/or ammonium sulfonate, and oleic, linoleic, or other fatty acids. Examples of such fatty acids are linseed oil, soya oil, wood oil, safflower oil, dehydraulic castroil, cotton seed oil, peanut oil, tall oil fatty acid, linseed oil fatty acid, the fatty acids of soya oil, wood oil, safflower oil or dehydrated castroil, and the products obtained from natural unsaturated oils or fatty acids by confugation or isomerization.

A key feature is that the emulsifier must be fugitive so that it breaks down on the workpiece surface and does not re-emulsify application of to the workpiece such as for example occurs in floor waxes.

D. Siloxane:

Siloxanes useful in the present invention are substituted with one or more alkyl groups, each alkyl group comprising preferably 1 to stet, more preferably 1 to 6, and most preferably 1 to 5 carbon atoms.

These products are commercially available from Dow Chemical, Union Carbide, and other suppliers. These are produced from silanes by condensation reactions to form a silica-oxygen-silica bound are as described in Dow brochure 22-240-A-78.

Preferred alkyl-substituted polysiloxanes are aminofunctional silicones, such as those described in U.S. Pat. Nos. 3,836,371, 3,508,933, 3,890,271 and 3,960,575.

The polysiloxanes will generally comprise from about 0.5 to 10 wt. %, more preferably from 0.5 to 5 wt. % and most preferably from 1 to 4 wt. % of the concentrates of the present invention.

E. Water:

As a partial or complete substituting agent for siloxanes are oil-soluble resins, including those commonly referred to as alkyds, acrylics, latexes, hydrocarbon resins, and natural gums and rosins, etc. These substitutes require an ability to form uniform films, although they need not necessarily be curable so long as they are reasonably stable and permanent.

Preferably the alkyd resins are derived from isophthalic acid, terephthalic acid, or phthalic anhydride modified so as to contain ester groups, which promote water dispersibility. These resins can be short oil, medium oil, or long oil.

The average molecular weight of the resin constituent will preferably be in the range of from 150 to 450, more preferably 250 to 425, and most preferably 300 to 400.

Also, the degree of branching in the resin molecules should be selected so that after esterification the average molecular chain will contain a sufficient quantity of hydrophelic ends to achieve easier water dispersibility.

The average acid number of the resins useful are preferably in the range of from 15 to 100, preferably 20 to 80, and most preferably 30 to 55.

Examples of commercially available resin are Kelsol resin from Spencer-Kellogg of Buffalo, N.Y.

The acrylic resin comprises 30–90 mole percent alkyl (meth) acrylate and 70–100 mole percent vinylic monomer containing a functional group selected from the group consisting of a carboxylic acid, a sulfonic acid, an anhydride, an amide, or an alkylol including salts of carboxylic or sulfonic acids.

While the concentrate formations may contain 0.01 to 40 wt. % or more of water (preferably demineralized), 0.05 to 10 wt. % water is preferred and 0.1 to 5 wt. % is most preferred. Emulsions will generally contain about 50 to 95 wt. % water, or more, with 70 to 90% being more preferred.

F. Sorbitans:

The polyoxyethylene derivative or fatty acid partial esters of sorbitol anhydrides of the present invention are preferably sorbitan derivatives and, without detracting from the generality, will be so referred to throughout this application. Without being bound by any theory, it appears that these molecules, having a hydrophilic end which seeks water and a hydrophobic end which seeks oil, tend to balance and couple the formulation into particularly stable emulsions. It is particularly surprising that, in addition, these sorbitan derivatives provide increased corrosion protective performance.

Preferred are the polyfunctional organic compounds e.g. sorbitan monooleate, sorbitan trioleate, myristates with hydroxy or amine polyfunctionality.

As mentioned above, the most preferred sorbitan derivative is sorbitan monooleate (molecular weight equals 465), which is readily available under a number of brand names e.g. "Tweens" 20 through 85, "Sorbax" (by Chemax of Greenville, S.C.), etc. from various suppliers, Atlas Chemical Division of ICI, Wilmington, Del., e.g. those described in McCutcheon "Emulsifiers and Detergents", MC Pub. Co., Glen Rock, N.J.

While the upper limits are primarily limited by economics, the sorbitan derivatives will generally be used in the formulations of the invention at levels of about 0.1 to 20 wt. %, more preferably 0.5 to 15, and most preferably 1 to 10 weight percent.

G. Organic Acid:

The organic acid which are a preferred but optional ingredient to the inventions of the present invention are preferably 12 to 54 carbon atoms, more preferably 14 to 20 and most preferably 18 (stearic) or isostearic and derivatives thereof e.g. oleic acid.

Particularly preferred is isostearic acid which is liquid at room temperature. The organic acid may possibly somehow react with the amino functional polysiloxane ingredient of the compositions, but the function of the organic acid is not entirely clear. It is known that the addition of organic acid will, in most cases, substantially increase the stability of the concentrate and the performance of the resulting coatings.

From about 0.1 to 10, more preferably from about 0.5 to 5 and most preferably from about 1 to 4 wt. % of the total formulation will preferably be organic acid. A preferred organic acid derivative is the alkyl carboxylate composition marketed by Lubrizol Corporation, Cleveland, under the brand name Lubrizol 5530, an antirust lubricant containing alkyl carboxylates amines and esters, see U.S. Pat. Nos. 4,237,022 and 4,216,099.

H. Metal Sulfonate:

A preferred feature of the present invention is the inclusion in the formulations of organic sulfonates. For best corrosion protection, it has been discovered that the preferred organic sulfonates are overbased (i.e., made with an excess of calcium, barium or other metal carbonate).

The preferred sulfonates are overbased with barium, calcium, potassium or sodium, and have sufficient equivalent weight to provided extended rust protection against corrosive environments. The preferable equivalent weights of these carboxylate, which are derived from alkyls, are as follows when overbased with the following metal sulfonates: sodium sulfonate with equivalent weight preferably 370 to 750, more preferably 400 to 650 and most preferably 450 to 600; barium sulfonate of a equivalent weight preferably 400 to 1400, more preferably 700 to 1300, most preferably 800 to 1200; and calcium sulfonate of an equivalent weight preferably 370 to 850, more preferably 400 to 800, most preferably 500 to 750.

The organic sulfonates of the present invention will generally be employed in quantities of from about 1 to 60%, more preferably from about 5 to 40% and most preferably from about 5 to about 30% based on the total weight of the formula.

The preferred chain length is from about 10 to 30, more preferably 12 to 24 and most preferably 16 to 20 carbon atoms. Molecular weights are preferably 10 to 50, more preferably 15 to 40 and most preferably 20 to 30.

I. Amine:

About 0.1 to 10 wt. % alkanol amine, preferably triethanol amine, may be added to provide additional wetability and stability where needed.

J. Miscellaneous Optional Additives:

Optional conventional ingredients might also be added, e.g. pigments, dyes, etc.

(2) Surface Treatment Processes

Surface treatment processes can be conventional such as chromate, and particularly preferred are nitriding or phosphating.

See generally Kirk and Othmer, "Encyclopedia of Chemical Technology, 2nd ed., vol. 18 (1969), pp. 282-303 and the later editions.

Phosphating can be accomplished by the conventional techniques such as those set forth in "Practical Phosphate Coatings", Mangill Company, and U.S. Pat. Nos. 3,967,948, 2,465,247, 3,686,031, 4,419,199, 4,539,051 and 4,540,637 and references thereto. For automotive uses, preferred phosphating is to a thickness of at least 2000-3000 mg zinc phosphate/square foot of workpiece.

Nitriding can be either salt bath or fluidized bed nitriding, such as the commercial processes "Tuff Tride", "Melonite", "QPQ" (Quench-Polish-Quench, in which salt bath nitriding is followed by quench in an oxidizing salt bath, followed by mechanical polishing, and a second quench), or fluidized bed nitriding as described in "Fluidized Bed Furnace Heat Treating Applications for the Dye Casting Industry", JAPKA, May-Jun., 1983, Die Casting Engineer. Miscellaneous surface treatment processes which may be employed with the invention include Procedyne's "Dyna-Case Surface Hardening Treatment", deep case carburization in a fluidized furnace by adding methanol which is vaporized and mixed with nitrogen and a small amount of natural gas to form a synthetic endothermic atmosphere within the treating furnace at about 899°-1010° C. (1650°-1850° F.) for 1-8 hours, carbonitriding at 815°-871° C. (1500°-1600° F.) for 10 minutes-1 hour, following by quenching; nitriding by adding nitrogen from raw ammonia onto the surface of the material at 510°-593° C. (950°-1100° F.) to provide a case of 0.001-0.015 inches deep; nitrocarburizing providing a case of 0.0005-0.0020 inches deep by contacting mixtures of natural gas and raw ammonia in a fluid bed furnace at 566°-621° C. (1050°-1150° F.) for 0.5-2 hours; steam bluing in a fluid bed furnace at 343°-538° C. (650°-1000° F.) for 20 minutes-1 hour to provide a blue or black surface, or even combinations of these conventional surface treatment processes.

Preferred techniques in the nitriding process useful with the invention can be found in the following publications: Honda JP Sho. 53-371, U.S. Pat. No. 4,496,401 (1985) assigned to Lucas Industries, Birmingham, England; a paper written by Z. Rogalski and H. Zowczak published at an American's society for material meeting 18 International Conference on Heat Treating held May 6-8, 1980 Cohall Detroit entitled "Fluidized Bed Methods of Nitriding and Oxy-Nitriding"; and U.S. Pat. No. 4,563,221 (1986) assigned to Lucas Industries, Birmingham, England.

(3) Concentrate Preparation

Apparatus: The apparatus for the present invention will be that conventionally utilized in the preparation of coatings compositions, e.g. kettles and mixing tanks having flow metering or measuring devices and agitation means, e.g. pumps mounted on side-arms connecting with the main vessel, internal stirrers, contra-rotating shearing devices and any of the other available devices which are well known to the art.

Temperature: The temperature during mixing may be different during different stages in the formulation. These temperatures are not narrowly critical and with will vary to provide faster mixing or better compatability of ingredients according to observation of those skilled in the art. For example, pressure vessels may be utilized for the purpose of lowering ingredient melting and boiling points, where useful, in order to provide better dispersion of difficult-to-mix ingredients.

Mixing Procedure: While the formulations of the present invention may be manufactured continuously if desired, batch techniques will be more usually employed. The sorbitan derivatives are then mixed in and the finished formulation is allowed to cook with, preferably, constant agitation, after which the formulation is drawn off into shipping containers, e.g. tank cars, tank trucks, drums or smaller cans.

Quality Control: The finished formulation, prior to packaging, will generally be checked for viscosity, freeze-thaw stability, corrosion-protection under accelerated conditions and other tests utilizing techniques well known to the coatings industry.

Application: The formulations of the present invention may be applied to substrates to be protected by conventional application techniques, such as spraying, brushing, dipping, flow-coating, dipspinning, "Filwhirl", or airless spraying. Coating thickness can be varied by changing the formulation, the number of coats, or the amount applied per coat but in general will be in the range from about 2 to about 5 mils after drying.

(4) Emulsion Preparation

The concentrate (e.g. prepared according to Example 1) is diluted with 1 to 20, or more preferably 2 to 15, and most preferably 3 to 8 parts by weight of water to form the emulsion which is applied to the workpieces. Dilution is preferably about 38° C. (100° F.), more preferably above 52° C. (125° F.), and most preferably at 52°-71° C. (125°-160° F.).

(6) Batch or Continuous Basis

While the examples describe the invention on a batch basis, it may come, of course, to be practiced on a continuous basis with continuous flows of starting materials into the mixing vessel and with continuous coating techniques e.g. roller coating continuous conveyor or even continuous work piece e.g. sheet steel moving continuously through a dip tank.

(6) EXAMPLES

EXAMPLE I

Formulation According to the Invention Providing Excellent Salt Spray Resistance and Shelf Life A conventional steam jacketed mixing kettle equipped with rotary stirred are added 66 parts by weight of naphthanic oil having a viscosity of 100 SSU at 38° C. (100° F.) and purchased as McMillan and 100 VR which is heated to 54° C. (130° F.). To the oil is added 20 parts by weight of emulsifying agent, ALOX 575 purchased from ALOX Corp., Niagara Falls, 5 parts by weight in the form of butyl cellosolve from Eastman Kodak Company, Rochester, N.Y., 2 parts by weight sorbitan derivative as sorbitan monooleate purchased from Chemax Corp. of Greenville, S.C., as Sorbax SMO and 1 part by weight sodium sulfonate as an additional emulsifier. Stirring continues during addition as a premixed composition purchased commercially, are added together 2.46 parts by weight polysiloxane as Dow 536, 2.46 parts by weight alkanolamide emulsifier as Witcamide 511 and 1.08 parts by weight of isostearic acid, although these could be added alternatively by reacting the isostearic acid with the polysiloxane. Heating is stopped but stirring is continued about 20 minutes to ensure a homogenious mixture. The contents of the mixing vessel are then sampled, quality control test for viscosity, stability and appearance are run and the formulation is draw off into 55 gallon drums. (Water is not added separately because the individual ingredients contain about 0.5 parts by weight based on the weight of the total formulation of water.)

The resulting formulation is tested for corrosion protection by applying it to a ferrous work piece which has been previously phosphated by conventional techniques, by dipping the work piece into an emulsion formed by adding one part by volume of the above formulation with 4 parts by volume of demineralized water. After drying for 24 hours, the test work piece is subjected to a 5% neutral pH salt (NaCl) spray at a temperature of 35° C. (95° F.) according to ASTB-117. The test panel resists failure (corrosion) for 39 days (936 hours).

A sample of the above formulation (undiluted) survives 5 successive freeze-fall cycles each comprising 16 hours at −18° C. (0° F.) following by 8 hours at 25° C. (77° F.) with no separation or other evident deleterious effects.

A sample of emulsion (diluted as specified above) shows no significant separation (i.e., less than 2% "cream") upon standing at room temperature for 24 hours.

When a work piece as previously described is dipped into the above formulation (diluted) and allowed to dry at room temperature at approximately 50% relative humidity, the coating is cured and cured in 24 hours. But remains self-healing i.e., scratch made with a scribe heals to protect the metal for about 24 hours.

(For comparison, a similar but unoiled phosphated workpiece fails in less than 48 hours and a similar but unoiled nitrided workpiece fails in less than 72 hours of salt spray.)

EXAMPLE II

Comparative According to U.S. Pat. No. 4,440,582

When a formulation is prepared according to the techniques described in U.S. Pat. No. 4,440,582 by repeating the techniques of Example II below, but omitting the sorbitan monooleate (Chemax Sorbax SMO) and the emulsifying agent (ALOX 575) and retaining the oil, the amino functional siloxane (Dow 536), the oil and the alkanolamide and isostearic acid and other ingredients in the parts by weight as specified in Table 1, as tested similarly to the tests described in Example I, the work piece exposed to the same salt spray fails after 26 days (624 hours), a reduction in salt spray failure time of about 33% as compared to the formulation of the present invention.

EXAMPLE III

Comparative-Without Siloxane

When a formulation is prepared according to the techniques of Example I, but using as ingredients only oil, emulsifier (sodium sulfonate), organic acid (oleic acid), and triethanol amine, both an extra corrosion inhibitor (high molecular weight from Ideas, Inc.) and a conventional defoamer from Diamond Shamrock, Morristown, N.J., the salt spray time failure is only 9 days (216 hours).

EXAMPLE IV

According to the Invention but Omitting the Sorbitan Monooleate Stabilizer

When a formulation is prepared according to the techniques of Example 1 and using the same parts by weight except that the sorbitan monooleate stabilizer is omitted, the work piece treated with the diluted formulation in accordance with the techniques of Example 1 survives 38 days (816 hours) in the salt spray before failure, a substantial improvement over the comparative formulation of Example 2, but slightly less than the preferred formulation of Example 1. However, the formulation exhibits substantial separation during a 24 hour room temperature test on the undiluted concentrate.

EXAMPLE V

Invention, Substituting Paraffinic Oil

When the techniques and tests of Example 1 are repeated but substituting a paraffinic oil for the naphthanic oil employed in Example 1, the resulting formulation survives 44 days (1056 hours) of salt spray test and the formulation is stable in both concentrated and emulsion form. This preferred formulation shows the superiority of the results obtained when paraffinic oil is substituted for naphthanic oil.

EXAMPLE VI

Invention With Stabilizer, Paraffinic Oil and Metal Sulfonate

When a formulation is prepared according to the techniques of Example V, but additionally adding 10 parts by weight of a metal sulfonate as Lubrizol 5530, leaving further improved salt spray resistance of 54 days (1296 hours) to failure are observed. The formulation is stable in both the concentrated and emulsion forms. This Example illustrates the most preferred formulation of the invention with salt spray resistance of more than twice that of the prior art compared to the Example II.

EXAMPLE VII

Invention Used on Nitrided Workpiece

When Example VI is repeated, substituting a nitrided workpiece for the phosphated workpiece, 42 days excellent protection is obtained, but the test is terminated before failure.

TABLE 1

| EXAMPLE | I Inv. | II Comp. | III Comp. | IV Inv. | V Inv. | VI Inv. | VII* Inv. |
|---|---|---|---|---|---|---|---|
| A. Oil | | | | | | | |
| 100 Pale | 66 | 76.1 | 83.5 | — | — | — | — |
| 330 Neutral | — | — | — | — | 53.35 | 43.35 | 53.35 |
| B. Glycol Butyl Cellosolve | 5.0 | 1.0 | — | 5.0 | 4.8 | 4.8 | 4.8 |
| C. Emulsifying Agent ALOX 575 | 20 | — | — | 28.5 | 27.4 | 27.4 | 27.4 |
| D. Siloxane (aminofunctional silicone, Dow 536) | 2.46 | 2.46 | — | 2.46 | 2.85 | 2.85 | 2.85 |
| E. Water (demineralized) | — | — | — | — | — | — | — |
| F. "Sorbitan" Sorbitan monooleate | 2 | — | — | — | 5.4 | 5.4 | 5.4 |
| G. Organic Acid Oleic Acid | — | 1.0 | 1.0 | — | 1.0 | 1.0 | 1.0 |
| H. Alkylcarboxylate Lubrizol 5530 | — | — | — | — | — | 10 | — |
| I Misc. Ingredients | | | | | | | |
| Sodium sulfonate | 1 | 12 | 12 | — | 1.1 | 1.1 | 1.1 |
| Witcomide 511 | 2.46 | 2.46 | — | 2.46 | 2.85 | 2.85 | 2.85 |
| Isostearic Acid | 1.08 | 1.08 | — | 1.08 | 1.25 | 1.25 | 1.25 |
| Triethanolamine | — | 1.5 | 1.0 | — | — | — | — |
| High MW | — | 2.0 | 2.0 | — | — | — | — |
| Sulfonate Nopco NDW | — | .5 | .5 | — | — | — | — |
| J. Tests | | | | | | | |
| Salt Spray (days) | 39 | 24 | 9 | 38 | 44 | 54 | 42+ |
| Stability (24 hrs) | | | | | | | |
| Concentrate | pass | pass | pass | fail | pass | pass | pass |
| Emulsion (20%) | pass | pass | pass | pass | pass | pass | pass |
| Self Healing? | yes | yes | no oily | yes | yes | yes | yes |

*Nitrided workpiece; + = Test terminated before failure

MODIFICATIONS

Specific compositions, methods, or embodiments discussed are intended to be only illustrative of the invention disclosed by this Specification. Variation on these compositions, methods, or embodiments are readily apparent to a person of skill in the art based upon the teachings of this specification and are therefore intended to be included as part of the inventions disclosed herein. For example, the formulation may be contain biocides, antifoamers, dyes, pigments, etc.

Other variations in the coating process are achieved by not necessarily heating the workpiece during coating. Waterborne coating that will not require a heated workpiece include material containing polyacrylamides and polyesters which are water soluble.

Reference to patents made in the specification is intended to result in such patents being expressly incorporated herein by reference including any patents or other literature references cited within such patents.

What is claimed is:

1. A method for coating metal parts, wherein said parts have a metal surface selected from the group consisting of: iron, cadmium, copper, tin, chromium, and zinc; which method comprises contacting said parts with an oil-in-water emulsion capable of application and flow onto said parts, and capable of curing to form a self-healing polymeric coating having improved salt spray resistance, wherein said emulsion in concentration form comprises:
    a. about 60–95 wt. % of aliphatic or naphthenic oil having a viscosity of about 50–500 seconds (SSU @ 37° C., 100° F.);
    b. about 0.1–15 wt. % of stabilizing agent comprising glycol or glycol ethers or derivatives thereof;
    c. about 5–50 wt. % of emulsifying agent comprising a sulfonate salt of alkaline earth metals;
    d. about 0.5–10 wt % of one or more polymers selected from the group consisting of: a curable siloxane resin containing either polyalkylsiloxane or alkylpolysiloxane or derivatives thereof; an oil-soluble resin containing either an alkyd, acrylic, latex, hydrocarbon resin, a natural gum or rosin; an oxidized petrolatum with an acid number in the range of about 20–70; and
    e. about 0.1 or more wt. % of water.

2. The method of claim 1 wherein the metal surface is copper.

3. The method of claim 1 wherein the metal surface is tin.

4. The method of claim 1 wherein the metal surface is cadmium.

5. The method of claim 1 wherein the metal surface is chromium.

6. The method of claim 1 wherein the metal surface is zinc.

7. The method of claim 1 wherein the concentrate further comprises one or more fugitive emulsifiers selected from the group consisting of: sodium sulfonate, ammonium sulfonate, oleic acid, linoleic acid or a fatty acid.

8. The method of claim 7 wherein the fatty acid is selected from the group consisting of linseed oil, soya oil, wood oil, safflower oil, dehydrated castor oil, cotton seed oil, peanut oil, tall oil fatty acid.

9. The method of claim 1 wherein the polymer of d. is an acrylic resin that comprises 30-90 mole % alkyl (meth) acrylate and 70-100 mole % vinylic monomer wherein the vinylic monomer is selected from the group consisting of a monomer containing a functional group selected from the group consisting of a carboxylic acid, a sulfonic acid, an amide, or an alkylol or alcohol and carboxylic acid or sulfonic acid salts.

10. The method of claim 1 wherein said metal surface is treated in accordance with one or more of the following surface treatments: phosphatized, nitrided, sand blasted, or galvanized.

* * * * *